UNITED STATES PATENT OFFICE.

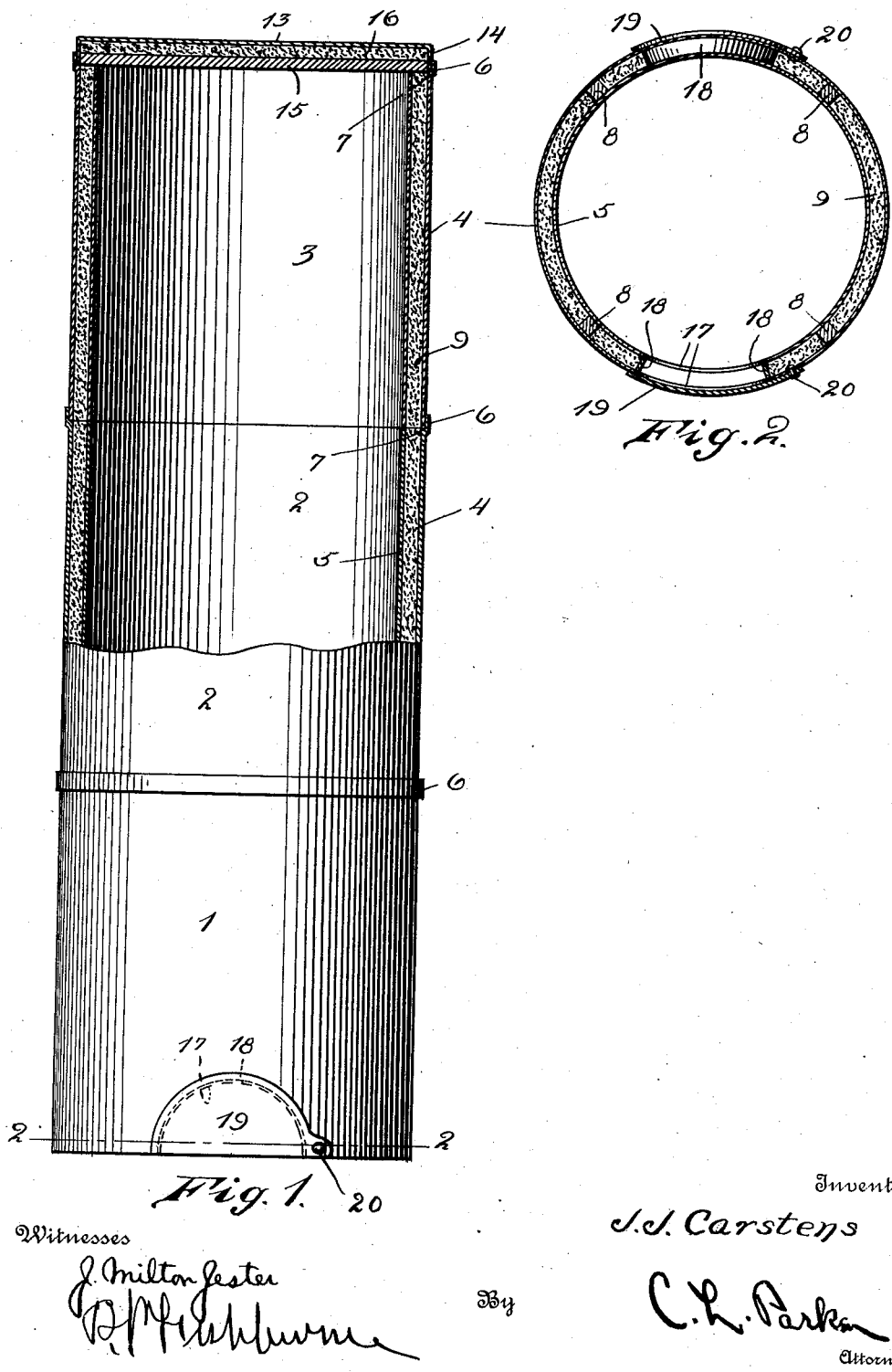

JULIUS J. CARSTENS, OF TULETA, TEXAS.

TREE AND SHRUB PROTECTOR.

1,021,447.

Specification of Letters Patent. Patented Mar. 26, 1912.

Application filed June 23, 1911. Serial No. 634,857.

*To all whom it may concern:*

Be it known that I, JULIUS J. CARSTENS, a citizen of the United States, residing at Tuleta, in the county of Bee and State of Texas, have invented certain new and useful Improvements in Tree and Shrub Protectors, of which the following is a specification.

This invention relates to a tree and shrub protector and particularly to such a device for housing plants to protect them from the cold weather.

An important object of my invention is to provide a device of the above character formed in a plurality of separable sections, which are adapted to be quickly and easily assembled.

A further object of this invention is to provide a housing for surrounding a plant and adapted to protect the plant from the cold weather and having means whereby the plant may be ventilated when necessary.

A further object of this invention is to provide a device of the above character, which is neat in appearance and cheap to manufacture.

Other objects and advantages of this invention will be apparent during the course of the following description.

In the accompanying drawings forming a part of this specification and in which like numerals are employed to designate like parts throughout the same, Figure 1 is a side view of the device, parts thereof being shown in section, Fig. 2 is a horizontal sectional view taken on line 2—2 of Fig. 1.

In the drawings wherein is illustrated a preferred embodiment of my invention, a housing for surrounding a plant is shown, formed of a plurality of detachable preferably cylindrical sections 1, 2 and 3. Each of these sections comprises an outer cylindrical shell 4 and an inner cylindrical shell 5 of smaller diameter and disposed concentrically within the outer shell 4. The upper end of each of the outer shells 4 is flared outwardly forming a flange 6 and an annular socket 7 to receive the lower end of the adjacent outer shell 4. In each section, a suitable number of spacing rods 8 are disposed between the shells 4 and 5 to extend longitudinally thereof and co-extensive therewith. The spacing rods 8 hold the shells 4 and 5 in their requisite concentric positions and these spacing rods are themselves held in place by frictional engagement with the shells 4 and 5 or they may be connected therewith by means of screws or the like. The annular space between the shells 4 and 5 is filled with earth 9 or any other suitable material which is a poor heat conductor.

The uppermost section 3 has its upper end closed by a removable lid adapted to fit snugly within the socket 7. This lid comprises a circular plate 13 provided with an annular depending flange 14, adapted to receive a circular floor 15, which is preferably formed of wood and attached to the flange 14 by suitable means. A space is provided between the floor 15 and the plate 13 and this space is filled with earth 16 or any other material which is a poor heat conductor.

The lowermost section 1 is provided at its lower ends with pairs of ventilating openings 17, preferably diametrically arranged. A curved strip 18 is disposed between the shells 4 and 5 and is positioned adjacent the registering openings 17 of each pair, to prevent the earth 9 from falling out of the space between the shells 4 and 5. Each pair of openings 17 is normally closed by a door 19, disposed upon the outer side of the outer shell 4 and pivoted thereto as shown at 20.

I preferably construct the shells 4 and 5 out of sheet-metal although I do not wish to restrict myself to this material alone as any suitable material may be employed. Instead of forming the protecting device in three sections it may be formed in a smaller or greater number of sections depending upon the height of the plant which is to be protected.

I wish it understood that the form of my invention herewith shown and described is to be taken as a preferred example of the same, and that certain changes in the shape, size, and arrangement of parts may be resorted to without departing from the spirit of the invention or the scope of the subjoined claims.

Having thus described my invention, I claim:—

1. In a device of the character described, a housing comprising outer and inner substantially cylindrical shells, a filling of poor heat conducting material to occupy the annular space between said shells, the outer shell having one end thereof flared to form an annular socket, and a lid to fit snugly within said socket.

2. In a device of the character described, a housing formed of a plurality of sections disposed in end to end relation, each of said sections comprising outer and inner substantially circular shells, means to retain said outer and inner shells in each section in their proper concentric position, and one end of the outer shell of one section being flared to form a socket for receiving the adjacent end of the outer shell of the other section.

3. In a device of the character described, a housing formed of a plurality of detachable sections disposed in end to end relation, each section comprising outer and inner shells, a filling of poor heat conducting material occupying the space between the outer and inner shells, and one end of one shell of one section being shaped to form a socket for receiving the adjacent end of the corresponding shell of the other section.

In testimony whereof I affix my signature in presence of two witnesses.

JULIUS J. CARSTENS.

Witnesses:
T. M. Cox,
R. L. Cox.

Copies of this patent may be obtained for five cents each, by addressing the "Commissioner of Patents, Washington, D. C."